(No Model.) 6 Sheets—Sheet 1.

T. STEBBINS & J. R. McDONALD.
FOLDING MACHINE.

No. 455,065. Patented June 30, 1891.

Witnesses
Chas. E. Gorton
A. S. Wills

Inventors
Timothy Stebbins and
James R. McDonald
By their Attorney
Joseph G. Parkinson

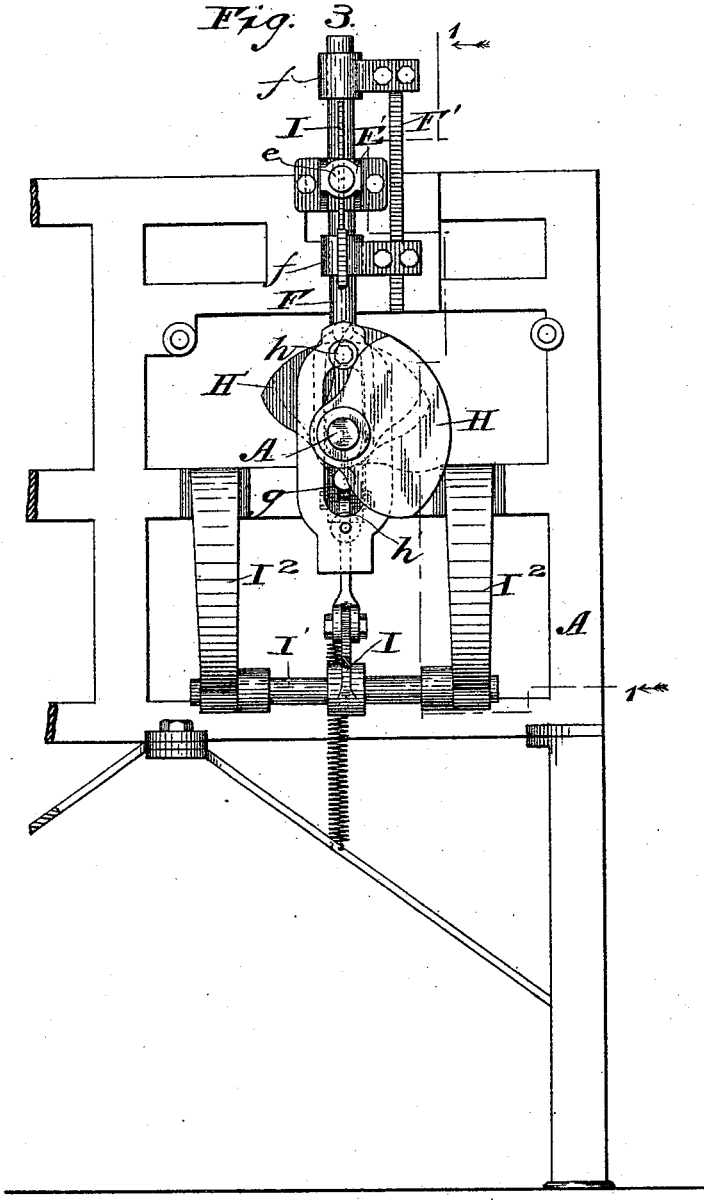

(No Model.) 6 Sheets—Sheet 3.
T. STEBBINS & J. R. McDONALD.
FOLDING MACHINE.
No. 455,065. Patented June 30, 1891.
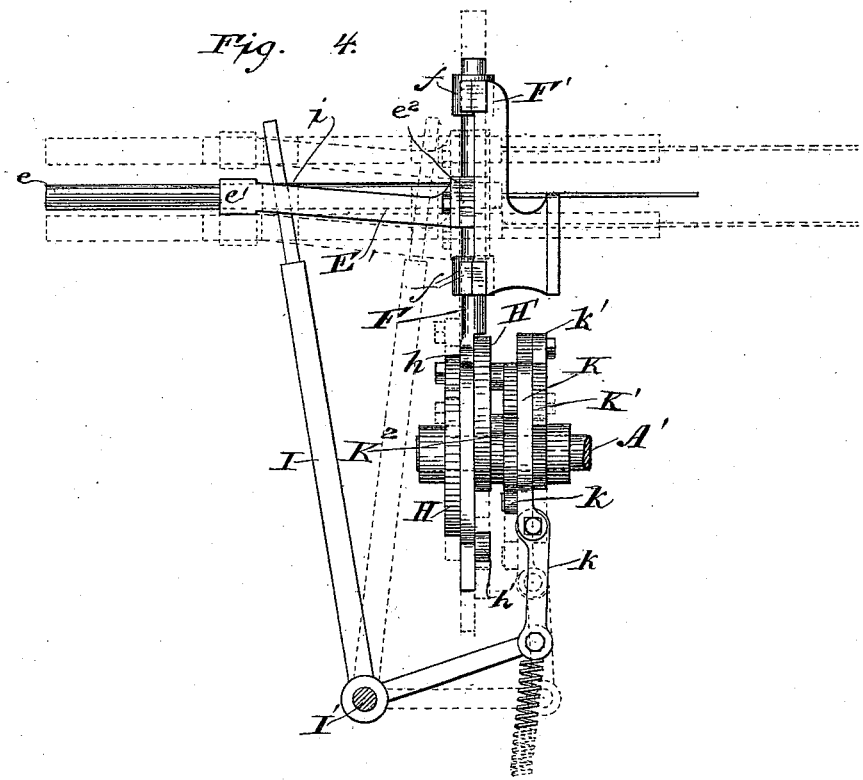
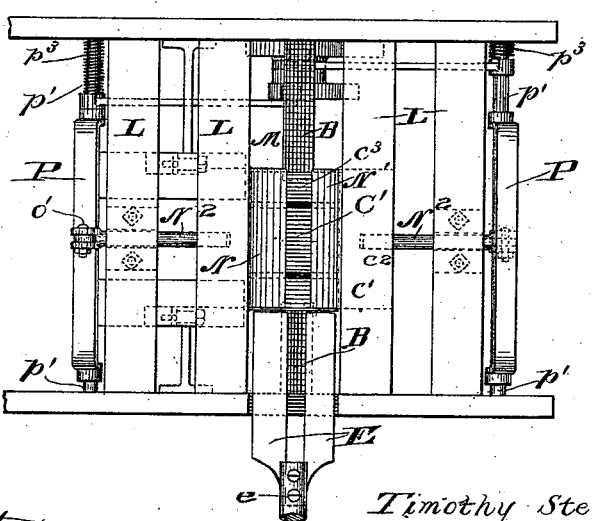
Witnesses
Chas. E. Gorton.
A. E. Wells.
Inventor
Timothy Stebbins and
James R. McDonald.
By their Attorney
Joseph M. Parkinson (No Model.) 6 Sheets—Sheet 4.
T. STEBBINS & J. R. McDONALD.
FOLDING MACHINE.
No. 455,065. Patented June 30, 1891.
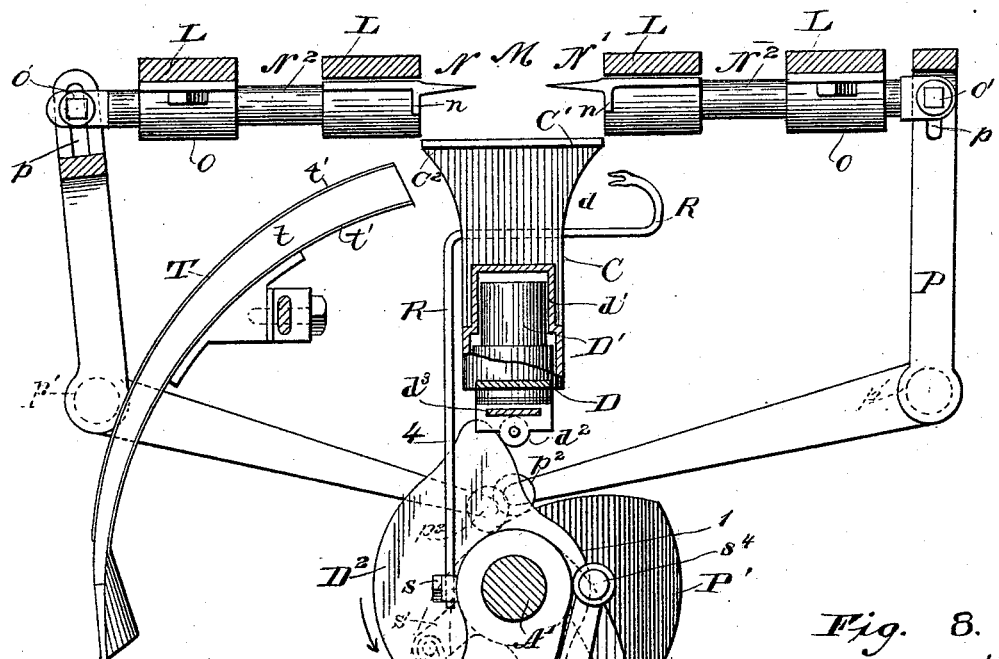
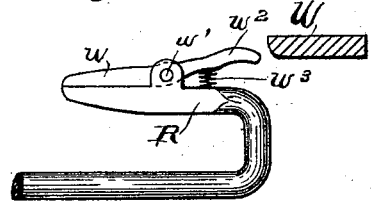
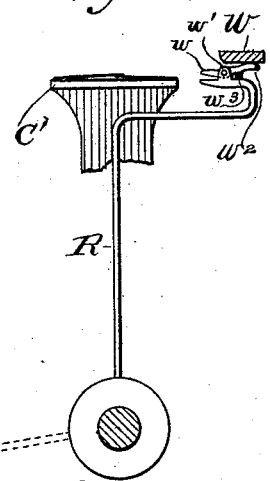
Witnesses
Chas. E. Gorton
A. S. Wells
Inventors
Timothy Stebbins,
and James R. McDonald
By their Attorney
Joseph G. Parkinson (No Model.) 6 Sheets—Sheet 5.

T. STEBBINS & J. R. McDONALD.
FOLDING MACHINE.

No. 455,065. Patented June 30, 1891.

Witnesses
Chas. E. Gorton
A. S. Wills

Inventors
Timothy Stebbins and
James R. McDonald
By their Attorney Joseph G. Parkinson (No Model.) 6 Sheets—Sheet 6.
T. STEBBINS & J. R. McDONALD.
FOLDING MACHINE.
No. 455,065. Patented June 30, 1891.
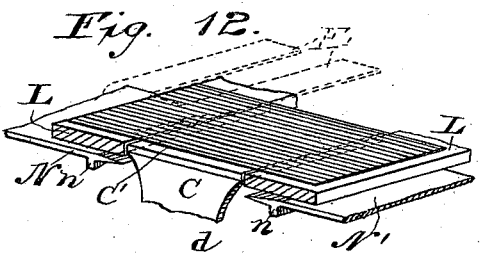
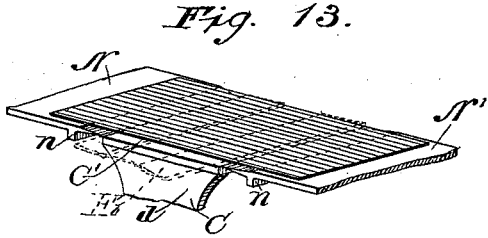
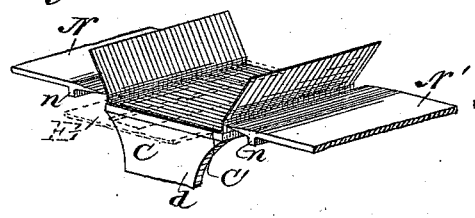
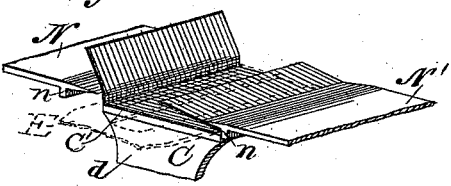
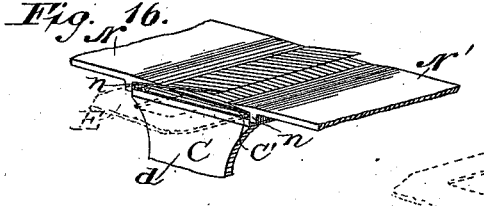
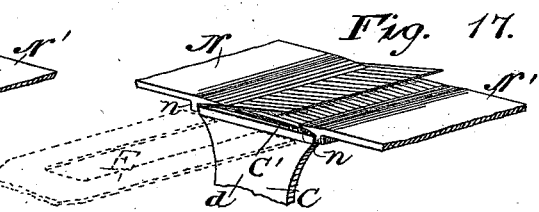
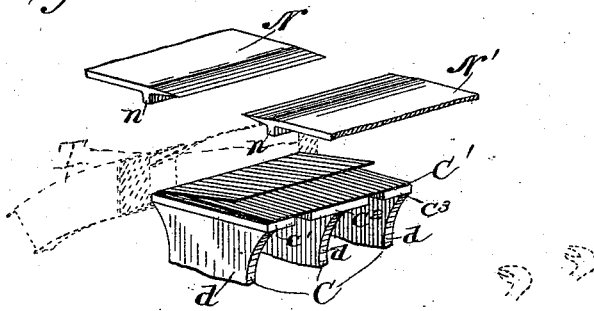
Witnesses
Chas. E. Gorton
A. S. Wells
Inventor
Timothy Stebbins and
By their Attorney James R. McDonald.
Joseph H. Parkinson

UNITED STATES PATENT OFFICE.

TIMOTHY STEBBINS AND JAMES R. McDONALD, OF CHICAGO, ILLINOIS, ASSIGNORS TO THE NATIONAL FOLDING AND ENVELOPING COMPANY, OF SAME PLACE.

FOLDING-MACHINE.

SPECIFICATION forming part of Letters Patent No. 455,065, dated June 30, 1891.

Application filed April 16, 1888. Serial No. 270,870. (No model.)

*To all whom it may concern:*

Be it known that we, TIMOTHY STEBBINS and JAMES R. MCDONALD, both citizens of the United States, residing at Chicago, in the county of Cook and State of Illinois, have invented certain new and useful Improvements in Folding-Machines, of which the following is a specification.

The object of our invention is to provide automatic means whereby circulars and like printed material may be folded in letter form—that is, with one fly lapped over the other in shape to be introduced in an envelope; and it consists, in general terms, of a rising and falling bed, a longitudinally-slotted table, with the upper surface of which and between the wings of which the bed rises flush or nearly flush to receive the circulars laid above it upon said table, an orbitally-moving paddle, which sinks beneath the table while the circular is being brought into position and then rises above it, and, advancing, descends upon the circular lying over the bed, devices which carry both bed and paddle downward beneath the wings of the table to turn up the flaps or flies of the circular, alternately-acting blades on either side of the table, which lay first one fly and then the other, and means whereby circulars thus folded are discharged from the machine.

Figure 1:
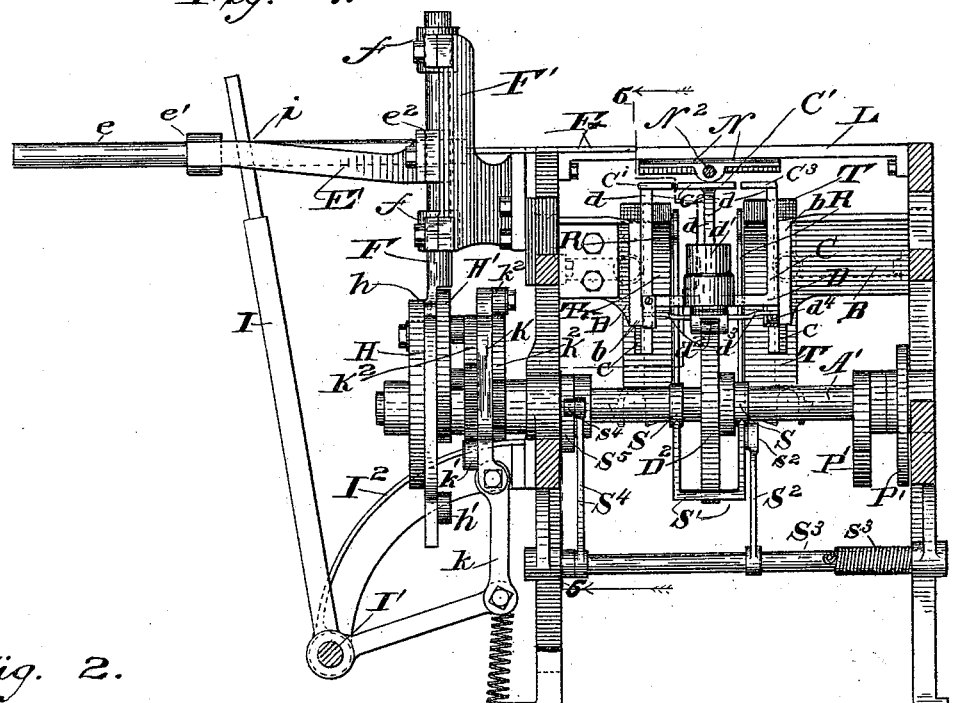
Figure 2:
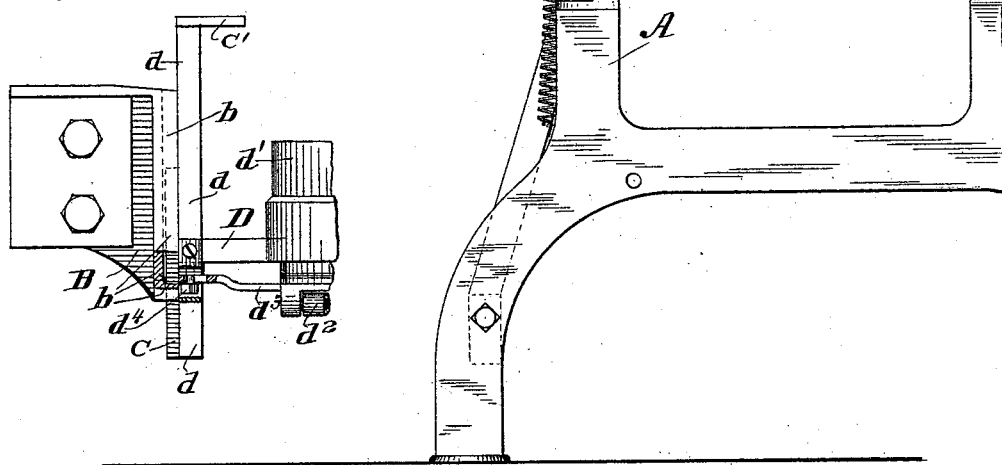
Figure 7:
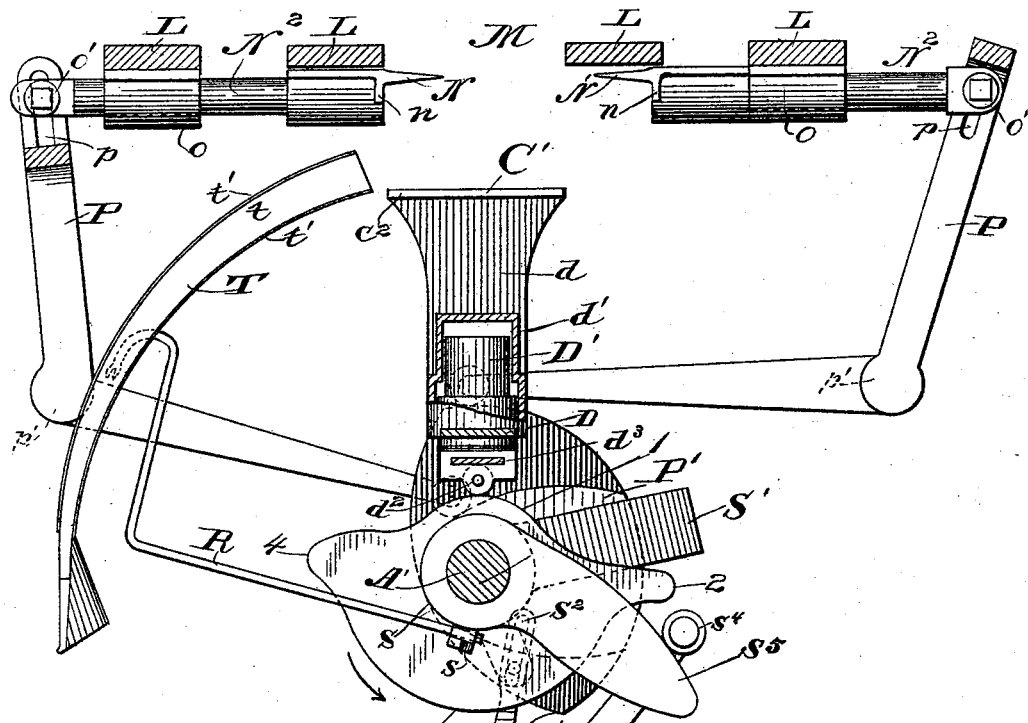
Figure 10:
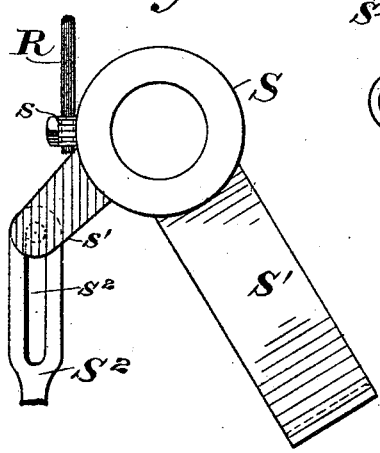
Figure 11:
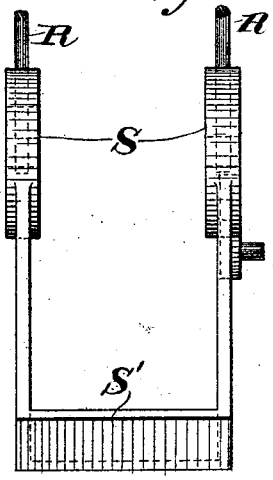

In the drawings, Figure 1 is a sectional elevation in side view taken on the line 1 1 of Fig. 3, of so much of a machine embodying our invention as will suffice to a proper understanding thereof; Fig. 2, an enlarged detail of a part of the bed-frame and a guide-bracket therefor. Fig. 3 is an elevation thereof, taken from the discharging end; Fig. 4, a diagrammatical detail in side elevation to illustrate the operation of the folding-paddle; Fig. 5, a top plan view of the immediate folding devices, together with the table along which the circular or other printed matter is fed; Fig. 6, a vertical transverse section on the correspondingly-numbered line in the first figure, showing the positions of parts just prior to the action of the ejector-arms; Fig. 7, a like section on the same line, showing the position of the parts when the ejector has nearly completed its sweep to discharge the folded matter; and Fig. 8, a modification of the ejectors for the purpose of dispensing with the chute; Fig. 9, an enlarged detail of said modification; Fig. 10, a detail in side elevation, and Fig. 11 a detail in rear elevation, of certain of the mechanism for supporting and operating the ejector-arms; Figs. 12 to 18, a diagrammatical series to illustrate the successive actions and positions in folding a circular or other printed matter.

A represents a strong frame for the support of the actuating and operating parts of the machine. Mounted in suitable bearings in this frame is a driving-shaft A', having power imparted to it from any suitable prime motor and carrying a series of cams, by which motion is imparted to the various effective parts of the organization, wherefore it may hereinafter be termed the "cam-shaft" or "driving-shaft" indifferently. Suitably secured to this frame are two brackets B, the adjacent faces of each of which are provided with vertical grooves $b$, forming guides which receive ribs or tongues $c$ from the vertical side bars or standards of a reciprocating frame C, hereinafter termed the "bed-frame," because it supports the bed C' at its upper end. This latter is composed, preferably, of three or more sections $c'$ $c^2$ $c^3$, divided transversely from each other to permit the sweep of the ejector-fingers when the folded material is to be discharged, each section being independently carried from the base-plate D of the frame by posts or standards $d$, the two outermost posts being the ones with guide ribs or tongues, as above suggested. At the center or about the center of the length of the base-plate of this bed-frame is a boss $d'$, into which the lower end of the central post or standard merges, and this boss is cored centrally from the under surface upward a suitable distance to receive a shouldered stud D', which carries at its lower end an anti-friction roll $d^2$, that rests upon the periphery of the cam $D^2$, fixed to and revolving with the driving-shaft or cam-shaft, whereby periodic vertical movements will be imparted to the bed and its frame with the revolution of the shaft to carry it up or let it sink, as presently explained.

Positive movement may be imparted to the bed-frame by means of the stud, provided it is of sufficient length beyond its shoulder to reach the end of the core; but for reasons hereinafter explained it is preferred to shorten it, so that it will not reach that distance, and to apply a spring between it and the bed-frame in such manner that the latter may yield toward the stud. To this end we have shown a half elliptic spring $d^3$, passed through a transverse opening in the lower end of the stud and arranged with its ends pressing up against the under surface of the base-plate or bed-frame at points on either side of said stud and equally distant therefrom. If desired, the ends of said spring can be confined by screws $d^4$, passed through them into the base-plate, the holes through which these screws pass being suitably elongated to allow free play of the spring as it is compressed. It is evident, however, that instead of the half elliptic spring, as described, a coiled compression-spring may be inserted in the core in the space between its bottom and the end of the stud, or at any suitable point along the length of the stud where it can be seated at one end against the bed-frame and at the other against the stud.

E is a horizontal blade or paddle, which is reciprocated longitudinally and vertically over, and corresponds in length and breadth to practically the corresponding dimensions of the bed. This paddle is secured to the end of a horizontal rod or shank $e$, which plays through and is guided by a bearing $e'$ in the end of the arm E', setting out from the vertically-reciprocating bar F, and by a second bearing $e^2$ in an enlargement of said bar, which latter is guided in its movement by the sleeves $f$ at the upper and lower ends of a bracket F', secured to and overhanging from the supporting-frame of the machine. The foot of this vertical bar is flattened and slotted, as at $g$, to take over the driving-shaft, and is provided with two anti-friction rolls $h\ h'$, one at the upper end of the slot and one at the side of the flattened extension, and the other at the lower end of the slot and at the opposite side of said extension. On each side of this flattened part are cams H H', fixed to the driving-shaft, the first cam engaging with the upper anti-friction roll to raise the bar, and the second cam succeeding at the proper time, the action of the first engaging with the lower anti-friction roll to depress the bar positively, thereby, by the alternate action of the cams, raising and lowering the paddle or folding-blade with a positive action. In addition to this vertical movement the folding-paddle requires, as already intimated, a reciprocating movement in a horizontal direction, so that it may, when at the length of its upward traverse, move forward over the material to be folded—that is to say, over the folding-bed—and stop temporarily while it is being carried down upon the bed and beneath the table with said bed and the matter to be folded, to crease or turn up the side flaps of the circular or other matter, and finally be drawn back horizontally while still in this depressed position beneath the table, to rise again at the extreme of its rearward reciprocation, somewhat resembling in this orbital movement the action of the so-called "four-motion feed." In order to impart this reciprocating movement, a vertical opening $i$ is made through the paddle-rod or shank, through which is passed the upper end or arm of an elbow-lever I, journaled or fulcrumed on a shaft I', carried in brackets or hangers I² from the frame, and either turning on said shaft or with it. The other arm of this hanger is connected by a link $k$ with a longitudinally-slotted yoke K, which embraces the driving-shaft and is provided at each end of its slot and on opposite sides thereof with anti-friction rolls $k'\ k^2$, which alternately engage cams K' K², fixed to the driving-shaft, to depress and raise the yoke, the first movement projecting the paddle and the second withdrawing it, the arrangement of the cams being such that the paddle will be held stationary against horizontal movement for a definite interval at each end of its reciprocation, and particularly at the limit of the forward projection, that it may have time to descend upon and with the bed beneath the table.

L represents the top of the machine or the "table," as it has heretofore been called, upon which the material to be folded is placed and brought over the bed. This table has a longitudinal opening M its whole length parallel with and beneath the paddle-rod, corresponding in width to the bed, and located in vertical register with the latter when in its lowest position; but when the bed rises its top is brought flush or about flush with the top of the table, so that printed material is momently supported by the two sides or wings of said table and by the bed, the paddle and its supporting-rod being beneath the table when such material is placed in position, but immediately thereafter rising and moving forward until the paddle is vertically over the bed, when it descends upon the printed matter and passes down beneath the table with the bed, the adjacent edges of the table or of its wings serving in this movement to crease or bend the flaps of the circular or whatever it may be up into a vertical position. In order to fold the vertical sides or flaps of the printed matter thus operated upon by the paddle, alternately and transversely moving folding knives or blades N N' are provided beneath each wing of the table. These blades in their normal position have their edges parallel to but slightly outside the vertical plane of the edges of the bed, so as not to interfere with the reciprocations of the latter or of the paddle. The reciprocations of the folding-blades over the bed correspond with the distance from the opening in the table to about the longitudinal center thereof, and in order to so limit their inward movement they are constructed with shoulders $n$ upon their under surfaces, which impinge against the side edges of the bed whenever one or the other of the knives is carried thereacross. The shanks $N^2$ of these blades pass through guide-bearings $o$, secured to and depending from the under surface of the table, and the outer ends of these shanks are provided with trunnions $o'$, which pass through elongated slots $p$ in the upper ends of arms of elbow-levers P, fulcrumed by means of journals $p'$, taking into bearings on the frame and engaging by means of anti-friction rolls $p^2$ at the ends of their lower converging or power arms with cams P' on the drive-shaft, almost reversely set, so that one knife may move first to lay one flap and the other follow it to lay the second fold or flap over the first. If the blades are stopped by their shoulders striking against the lateral edges of the bed, as above proposed, it is practically necessary that their inward or effective movement toward such bed should be imparted by a yielding and not a positive agency. Therefore, springs $p^3$ are coiled around the pivots of the elbow-levers, one end of each spring being seated against the adjacent lever-arm and the other against the frame in such manner that the spring shall urge the lever-arm and its blade inward toward the bed whenever the anti-friction roll on the end of the other or power arm reaches the cut-away reach $p^4$ of its cam. However, if the shoulders should be omitted, the movements of the blades may be effected by any other suitable mechanism. During these movements just adverted to it will be noticed that the paddle continues to rest upon the printed matter and hold it down against the bed, and that the flaps are laid over upon the upper surface of the paddle; but immediately upon the termination of the inward reciprocation of the blades and while they are still engaged with the flaps, as indicated in Fig. 17 of the diagrammatic series, the paddle is withdrawn horizontally from the folded matter and to the extreme of its reverse reciprocation, where it is again elevated. The cam which operates the bed revolves in the direction indicated by arrows in Figs. 6 and 7, and has several reaches, the first of which, numbered 1 in Fig. 7, is the lowest or described on the shortest radius, and is concentric with the axis of the driving-shaft, so that while the anti-friction roll at the foot of the supporting-stud of the bed-frame is traveling on this reach the bed will be at its lowest position and stationary for a considerable interval of time, sufficient for the ejection of the previously-folded material and for the bringing of fresh material upon the table above it. The next reach, numbered 2, is a rapid outward reach or rise terminating upon a radius of sufficient length to carry the top of the bed flush with the table, when it sinks rapidly away to the succeeding reach, numbered 3, concentric with the axis of the driving-shaft, like the first, but on a longer radius and adapted to bring the bed beneath the transversely-reciprocating folding-blades, but so slightly below them as to allow them to just clear the paddle, when they successively move inward over the bed. To this third reach succeeds the one numbered 4, which is a short outward rise on a radius less than the second reach to carry the bed up against the overlying folding-blades immediately after the paddle has been withdrawn, so as to squeeze the folded material against these blades and permanently set the fold. In this last movement the elastic or yielding connection between the bed and its support serves to compensate for any variation in the thickness of the material being folded—as, for instance, when several circulars have been nested together to form a single inclosure for the mail.

Rapidly succeeding the squeezing of the folded matter against the blades, the anti-friction roll on the stud returns to the first reach of its cam by a rapid inward incline, bringing the bed abreast the ends or points of the oscillating ejector-arms R. These are arranged one opposite each of the transverse slots or openings through the bed, and are secured to lugs from collars S, loosely journaled on the driving-shaft, and when in their normal position they project vertically therefrom past the base-plate of the reciprocating frame, then horizontally over the same at some distance thereabove between the posts or standards of said frame, and finally are turned back upon their lengths, forming goose-necks having their extremities provided with fingers, or notched to embrace the edges of the folded matter when they are oscillated. The sleeves to which these ejector-arms are attached are connected so as to move simultaneously by a yoke S', which serves also to counterbalance the arms and tend to restore them to position after they have been actuated. A short heel projection $s'$ from one of the sleeves or collars is provided with a pin that takes into a slot $s^2$ in the end of an arm $S^2$ from a rock-shaft $S^3$, which, for the purpose of restoring the ejector-fingers to position after they have been operated, has a spring $s^3$ coiled about it and attached at one end to the frame and at the other to the shaft to exert its force properly upon the fingers. A second arm $S^4$ from this shaft has at its upper end an anti-friction roll $s^4$, which engages with a cam $S^5$ on the driving-shaft, this cam being of such outline (shown in Fig. 6) and so arranged with reference to the cam which actuates the bed-frame that when the bed is at the proper position for the ejector-fingers to sweep the folded material therefrom the rock-shaft will be actuated, swinging the ejector-arms from the position represented in Fig. 6 across the bed a distance depending upon the direction in which the folded material is to go or the mechanism which is to receive it—as, for instance, to and somewhat past the position shown in Fig. 6, when the curved chute T is employed. This chute T is described on an arc concentric with the axis of vibration of the ejector-arms which sweep the folded material along it to its end and deliver it into the envelope or into a suitable receptacle for its reception. The chute is constructed of two curved frames $t$, parallel with each other, having plates $t'$ secured to their upper and under surfaces, projecting from their inner sides a corresponding distance toward the plates on the opposite frame, thus forming lips which are slightly farther apart at the mouth of the chute than at their discharge ends. The two sections of the chute will of course be spaced apart from each other, according to the length of the folded material that is to pass between them, so that they may support its ends while the ejector-arms sweep the open space between. Instead of the oscillating ejector-arms and curved chutes, however, horizontal reciprocating arms may be employed to sweep the folded matter into horizontal channels or guide-passages.

The chutes, while desirable, may be dispensed with entirely by providing the ends of the ejector-arms with gripping devices, as in Figs. 8 and 9, in which the vibrating finger or jaw $w$ is shown pivoted to and between lugs $w'$ near the free end of the arms and arranged to close over the end of the arm, being provided with a heel-extension $w^2$ back of its pivotal point, which deflects upward and is pressed upon by a suitable spring $w^3$, placed between it and the arm in such manner that its tendency is to keep the jaw down upon the arm, so as to clasp the folded matter securely. When the arms carrying these clamping fingers or jaws are at the limit of their upward or rearward stroke or reciprocation, as the case may be, preparatory to sweeping the folded matter off of the bed—that is to say, when they are in their normal position—the extensions or heels of the pivoted jaws or fingers are depressed by a suitable obstruction W, thus opening the jaws. As, however, the arms move forward and enter the transverse slots in the bed, the heels escape from under the obstruction referred to and the jaws close down over the edge of the folded matter and remain closed thereupon, clamping it against the end of the arms until said arms approach the limit of this stroke away from the bed, whereupon said heels meet another obstruction W', which again depresses them and opens the jaws, releasing the folded matter.

In operation the sheet to be folded is placed or brought over the opening in the top or table of the machine, and the paddle, which is then in the highest position, (represented by broken lines in Fig. 3,) is projected until immediately over said sheet, the bed at the same time rising until about flush with the top of the table, as indicated in Fig. 10. Then the paddle descends vertically until it reaches the sheet, as in Fig. 11, and presses it against the bed, which immediately descends, the paddle following concurrently to the position represented in Fig. 12, where the upper surface of the paddle is just below the folding-blades, one of which—to wit, the one farthest from the discharge side or from the chute—moves forward, folding one of the flaps, which have both been turned up by the edges of the table in the descent of the bed and paddle down over the top of the paddle, as in Fig. 13, and while this blade is still resting upon the flap that it has laid or folded the other blade is actuated to lay the second flap over the first, as in Fig. 14, and the blades still remaining pressed against the bed and overlying the flaps the paddle is withdrawn, when the bed instantly moves up to squeeze and compress the folded material against the blades and gives it its set, as in Fig. 15, and then is withdrawn, as in Fig. 16, until opposite the mouth of the chute or in its lowest position, when the ejector-fingers immediately act.

It is evident that the paddle and the folding-blades may be operated by different mechanism than that described, also that so far as the folding mechanism is concerned it is immaterial to what the folded material is delivered; and we therefore do not intend to limit ourselves to any special mechanism for either of these purposes, although we have described that which is now best known to us; but What we do claim, and desire to secure by Letters Patent, is—

1. The combination, substantially as hereinbefore set forth, of the rising and falling bed, the paddle actuated to descend upon said bed and be withdrawn parallel with the face thereof, and the transversely-reciprocating folding-blades.

2. The combination, substantially as hereinbefore set forth, of the rising and falling bed, the paddle, the transversely-reciprocating blades having stops to engage with the lateral edges of the bed, the levers for actuating said blades, and means whereby said levers are actuated in succession one after the other.

3. The combination, substantially as hereinbefore set forth, of the slotted table, the rising and falling bed registering with the lateral edges of the opening through the table, means whereby the bed is raised to a position practically flush with the surface of the table and retracted beneath it, the paddle, and means for actuating said paddle, whereby it is caused to advance over the bed and then descend upon and with it, and finally to withdraw parallel with the face of said bed.

4. The combination, substantially as hereinbefore set forth, with the transversely-reciprocating folding-blades of the rising and falling bed, of a stud entering a socket in the base-plate thereof, a spring connecting said stud and the base-plate or frame of the bed, and a cam whereby the bed is raised and allowed to fall, formed with a rise or outset to lift the bed slightly against the blades after the flaps of the circular have been folded.

5. The combination, substantially as hereinbefore set forth, of the rising and falling bed having a yielding connection with its supporting-stud, the paddle, the transversely-reciprocating blades, and the cam having practically the outline described, whereby the bed is first lifted to meet the paddle and then brought down beneath and with said paddle to the under surface of the blades, lifted slightly to squeeze the folded matter against the blades, and finally withdrawn from their vicinity.

6. The combination, substantially as hereinbefore set forth, with the slotted table, of the rising and falling bed, the paddle, the transversely-reciprocating blades, and the cam for actuating the bed having practically the outline set forth, whereby the bed is first raised flush with the table and then withdrawn for the action of the blades, next lifted against the blades to squeeze the folded material, and finally withdrawn from their vicinity.

7. The combination, substantially as hereinbefore set forth, of the rising and falling bed, its actuating-cam, the orbitally-moving paddle, the transversely-reciprocating blades arranged to fold the matter over the exposed upper surface of the paddle, and ejectors for pushing the folded material transversely off of the bed.

8. The combination, substantially as hereinbefore set forth, of the rising and falling bed, its actuating-cam, the orbitally-moving paddle, the transversely-reciprocating blades, ejectors for pushing the folded material transversely off of the bed, and suitable receiving and guiding mechanism into which it is carried by the ejectors.

9. The combination, substantially as hereinbefore set forth, of the rising and falling bed, its actuating-cam, the orbitally-moving paddle, the transversely-reciprocating blades, ejectors for pushing the folded material transversely off of the bed, and the curved guides or chutes along which the ejectors push the folded material.

10. The combination, substantially as hereinbefore set forth, of the transversely-reciprocating blades, the transversely-slotted bed, ejector-fingers arranged to sweep between the transverse sections of said bed, and means for vibrating said fingers.

11. The combination, substantially as hereinbefore set forth, with the folding-bed, of the paddle, means for reciprocating the paddle-support vertically, and means for reciprocating the paddle itself horizontally, whereby it is moved in a practically rectangular orbit to bring it down upon the material to be folded lying over the bed and to withdraw it horizontally therefrom after the folding operation.

12. The combination, substantially as hereinbefore set forth, with the bed and folding-blades working thereover and with the paddle and its vertically-reciprocating support, of the elbow-lever having an arm playing through the shank of said paddle, and the cams which operate said elbow-lever, whereby said paddle is projected forward when its support reaches the limit of its upward reciprocation and is withdrawn subsequent to the time when said support reaches the limit of its downward reciprocation.

13. The combination, with the bed C', divided transversely into sections, paddle E, as described, and transverse reciprocating folding-blades N, of the arms R and the chutes T, as and for the purpose set forth.

14. The combination, with a bed C', divided transversely into sections, paddle E, as described, and transverse reciprocating folding-blades N, of the oscillating arms R and the curved chutes whose course corresponds to an arc struck from the center of oscillation of said arms and of a corresponding radius.

15. The combination, with a bed divided transversely into sections, the ejector-arms R, and the transversely-reciprocating folding-blades, of the paddle E, horizontal reciprocating bar $e$, in the end of which said paddle is secured, bar F, cams H H', and drive-shaft, as set forth.

16. The combination, with a bed and the transverse reciprocating folding-blades, of the paddle E, horizontal reciprocating bar $e$, in the end of which said paddle is secured, bar F, cams H H' and K K', lever I, link $k$, actuating-frame K, as described, and cams K' K², as set forth.

17. The combination, with the bed and the orbitally-moving paddle, as described, of the transverse reciprocating blades N, bars N², elbow-levers P, cams P', and drive-shaft, as set forth.

18. The combination, with the bed and the paddle, as described, of the transverse reciprocating folding-blades N, having the shoulders $n$, bars N², elbow-levers P, cams P', and drive-shaft, as set forth.

19. The combination, with the bed, the orbitally-moving paddle, as described, and the transversely-reciprocating folding-blades, of the frame supporting the means for operating said devices, having a plane top provided with an opening M in register with and above the bed, as set forth.

TIMOTHY STEBBINS.
JAMES R. McDONALD.

Witnesses:
FRANK D. THOMASON,
JOHN S. McCLURE.